March 26, 1968  H. U. KLIPPERT  3,375,362
MEANS TO CONTROLLABLY DIRECT A PLURALITY OF SPOTLIGHTS
Filed March 21, 1966  4 Sheets-Sheet 3
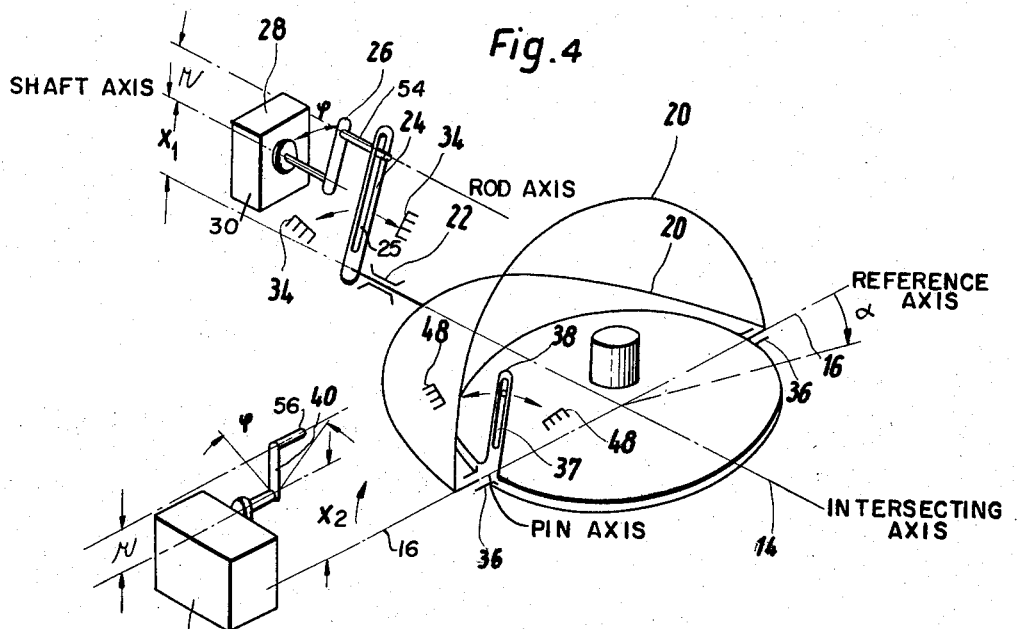
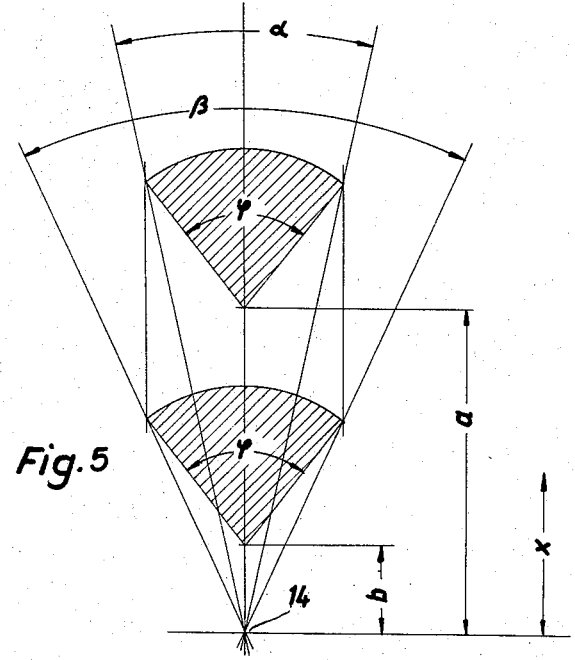
Inventor:
Hans Ulrich Klippert
BY *Otto John Munz*
ATTORNEY INVENTOR.
Hans Ulrich Klippert

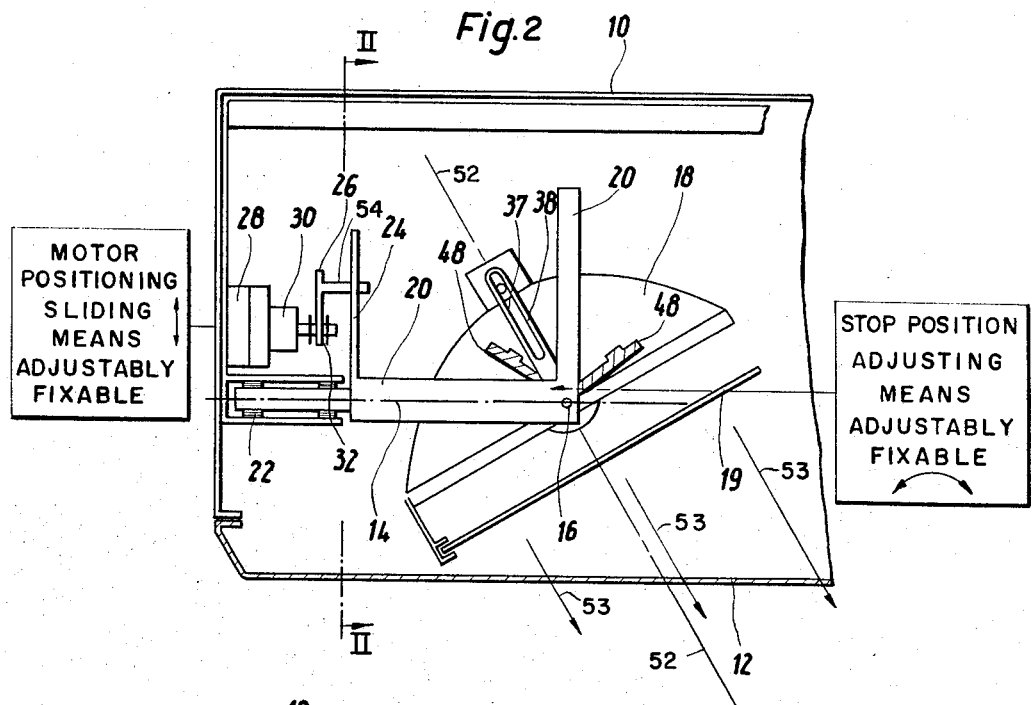

United States Patent Office 3,375,362
Patented Mar. 26, 1968

3,375,362
MEANS TO CONTROLLABLY DIRECT A PLURALITY OF SPOTLIGHTS
Hans U. Klippert, Hanau (Main), Germany, assignor to Quarzlampengesellschaft mbH, Hanau (Main), Germany
Filed Mar. 21, 1966, Ser. No. 536,079
Claims priority, application Germany, Mar. 24, 1965, Q 824
7 Claims. (Cl. 240—1.4)

ABSTRACT OF THE DISCLOSURE

A lighting system provided with a plurality of individual spotlights, each comprising a reflector: a light source; said light source situated within said reflector to produce a beam of light; a first and second rotational means to cause rotations of said reflector about a reference axis thereof and about an intersecting axis, intersecting said reference axis, said first rotational means to rotate said reflector about said intersecting axis, said second rotational means to rotate said reflector about said reference axis.

---

The invention relates to means for simultaneously directing a plurality of optical devices, for instance spotlights, onto a limited region of a working surface.

The subject matter of the parent copending patent application comprises a certain type of means for simultaneously directing a plurality of spotlights.

The primary object of the present invention is to provide means for placing separate spotlights in a ceiling at spaced locations most favorable for their lighting effectiveness and for simultaneously pivoting them by remote control in such a way that their beams continue to coincide at selected limited working regions.

Another object of the invention is to provide means for synchronizing the pivoting motions and a separate means for re-adjusting this synchronization, should it be lost for some reason.

Another object of the invention is to provide a lighting system that is amenable to mass production from prefabricated parts.

Other objects and many advantages of the invention will become apparent to those skilled in the art, after a study of the following detailed description in connection with the accompanying drawings, wherein:

FIG. 2 is a schematic sectional view of one spotlight assembly.

FIG. 3 is a sectional view according to the section line II—II in FIG. 2.

FIG. 4 is a perspective schematic presentation and

FIG. 5 is a schematic presentation of the different angles of rotation.

The drawings depict an embodiment of the invention using electrical motor drives.

Figure 1:
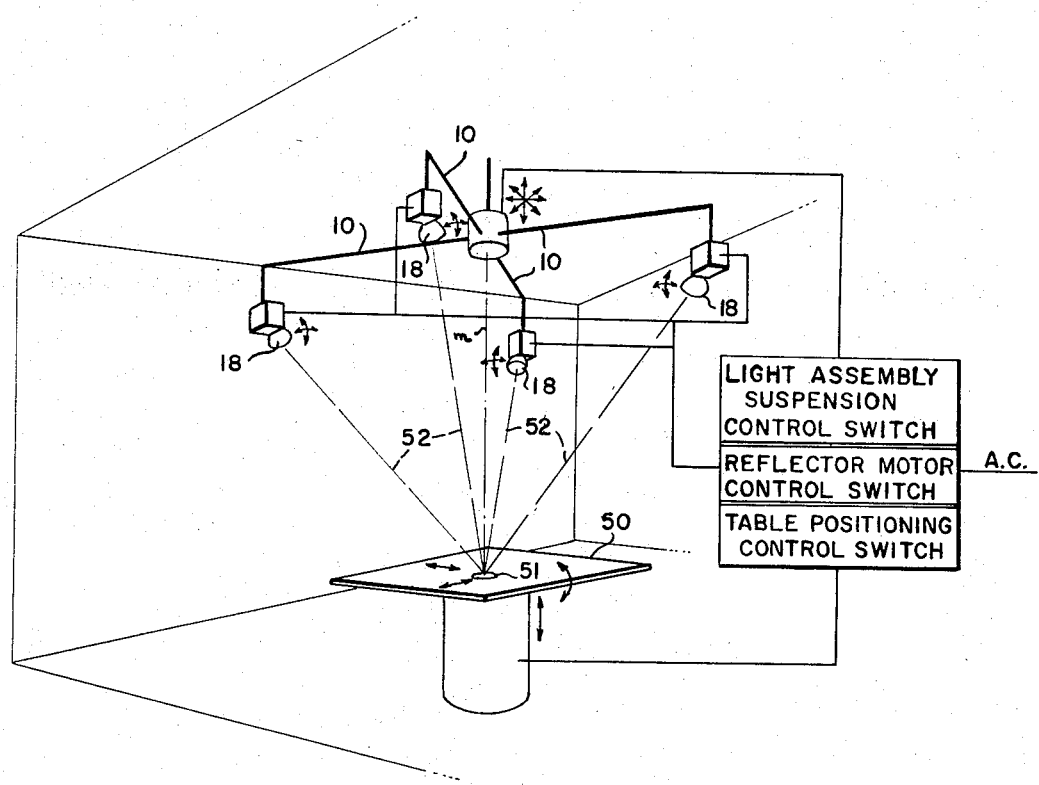
FIG. 1 is a perspective view of an operating theater showing the spotlights of the invention situated about the central axis of a working region at critical locations in the ceiling.

Referring in detail to FIG. 1, an operating heater is shown having spotlights situated at critical points on its ceiling or on a common frame suspended therefrom. Only the support housings 10 of four spotlights are shown. The housings protrude slightly from the ceiling to expose their entire translucent or transparent undersides to the theater, which are provided optionally. Beams of light 52 are directed onto a limited working surface 51 such as on an operating table 50. The vertical axis m of the working surface is shown. Each light reflector is provided with 2 motors, for pivoting on 2 axes described hereinafter.

A single source of A.C. current, light on-off and intensity control means, and on-off and reversing means for the two sets of spotlight pivoting motors are shown in block diagrams.

FIGS. 2, 3, and 4 show a single spotlight gimbaled on two horizontal perpendicular axes, the reference axis 16 and the intersection axis 14 in a support housing 10 with a cover plate 12 of transparent or translucent material located in the direction of reflection in the path of the rays 53 of the beam of the spotlight. Each single spotlight comprises a reflector 18 and a light filtering plate 19 shown in FIGS. 2 and 3.

A frame 20 is rotatable about the intersecting axis 14 and is mounted in a journal bearing 22. The intersecting axis 14 coincides with the rotational axis of the bearing. The frame 20 has a crank 24 and a rod 54 is mounted on the end of an arm 26. The rod reaches into the crank groove 25. The arm 26 is driven by an electric motor 28 equipped with a transmission 30 and a frictional clutch 32. The motor 28 is a synchronized reversible motor that can be electrically switched between its rotational directions as shown in FIG. 1. Motor 28 positioning sliding means for moving the point of attachment of this motor upwards and downwards relative to the housing manually or otherwise is shown in a block diagram in FIG. 2. The shaft of this motor lies in a vertical plane and parallel to the intersection axis 14.

The extent of rotation of the crank 24 and consequently the extent of rotation of the frame 20 about the intersecting axis 14 is limited by stops 34 as shown in FIG. 3. Stop-position adjusting means are shown in a block diagram of FIG. 2.

The reflector 18 is connected with a crank 38 for rotation about the axis reference 16, which runs at right angles to the intersecting axis. This rotation occurs about pins 55, in bearings 36 which are schematically shown in FIGS. 3 and 4. A rod 56 on arm 40 makes contact in a groove 37 in the crank 38. The arm is driven by a motor 42 using a transmission 44 and a frictional clutch 46.

Motor positioning sliding means are moving the point of attachment of this motor on the frame radially inwards and outwards relative to the reference axis 16. The shaft of this motor runs parallel to the reference axis 16 and lies in the plane formed by the symmetry axis 56 of the reflector and the reference axis 16. The extent of rotation about the reference axis 16 is limited by stops 48 (see FIG. 2). Stop position adjusting means are shown in FIG. 3 in block diagram.

Operation of the apparatus can best be illustrated using FIGS. 4 and 5. In principle, rotation about the intersecting axis 14 proceeds in the same manner as rotation about the reference axis 16. The only difference lies in the fact that the motor 28 for rotation about the intersecting axis 14 is fixed adjustably relative to the housing 10, while motor 42 for rotation about the reference axis 16 is adjustably mounted in the frame 20. Fixing of the positions of the shaft axes of the motors 28 and 42 is made as shown in FIG. 4 from the axes 14 and 16 at distances $x_1$ and $x_2$. The distances $x$ depend on how far these axes are from the central axis 52 of the working surface to be lit by the projected light.

The correct distances $x$ can be either computed or determined empirically and the motor positioning sliding means can be used at the time of installment to set the proper $x$ distances of both rotational axes of every spotlight.

Figure 6:
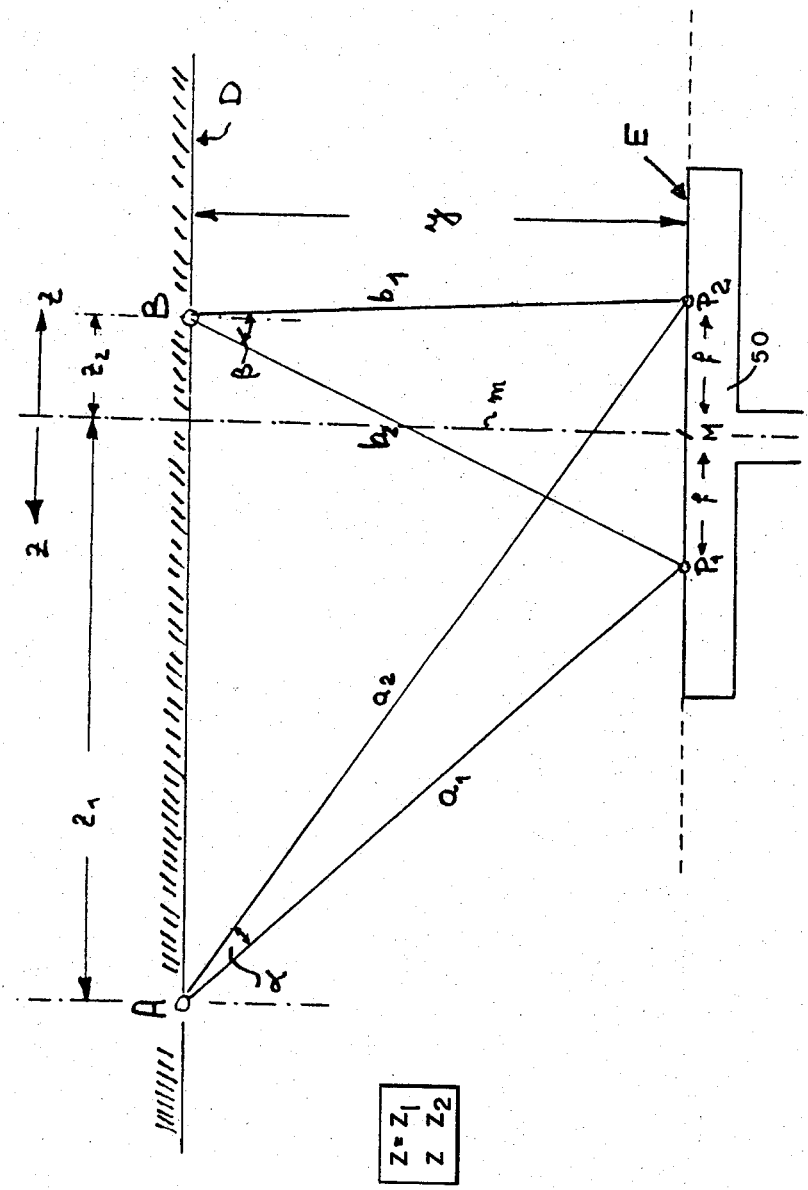
FIG. 6 shows the physical relationships important for correct synchronizing of rotations of spotlights.

FIG. 6 shows the important relationships for computing the distances $x$. The always equal distances $r$ between rods 54 and 56 and their respective motor shafts are shown in FIG. 3. The $r$ value is the exact axial distance between the shaft axes of the motors 28 and 42 to the axes of the rods 54 and 56 respectively.

Two spotlights A and B are shown in FIG. 6 located in the plane of the ceiling D to cover the plane E from points $P_1$ to $P_2$ for moving illumination thereof. The plane E can for example be a theater stage or the operation table 50. The plane E is located at a distance $y$ from the ceiling D. In FIG. 6 the middle M of the field of coverage is shown through which passes the central, vertical axis $m$. The field to be covered has a radius $f$ about the midpoint.

A plurality of spotlights spaced by distances $z$ from the axis $m$ are placed in the ceiling. The spotlight A is shown at a distance $z_1$ from the axis, while spotlight B is at a distance $z_2$. Only the geometric centers of these spotlights are shown. These centers correspond to the intersections of the axes 14 and 16 in each spotlight.

A ray of light $a_1$ from the center of spotlight A falls on point $P_1$. Rotation of the spotlight A through the angle $\alpha$ causes the ray, now designated as $a_2$, to fall on point $P_2$. At the same time, spotlight B rotates synchronously through an angle $\beta$ to direct ray $b_2$ from point $P_1$ to ray $b_1$ falling on point $P_2$.

Provided that all motors rotate through the same angle $\varphi$ of FIG. 5 in equal time, the following equation is obtained relating the quantities $r$, $\varphi$, $x$, $y$, $z$, and $f$.

$$\frac{r^2 \sin^2 \varphi}{x^2 + r^2 + 2xr \cos \varphi} + \frac{(y^2 + z^2 + f^2)^2}{(y^2 + x^2 + f^2) - 4z_1 \cdot f^2} = 1$$

Because of its complexity, it is expressed in implicit form.

In a practical situation, the variable quantities are essentially the distances $x$, the distances $z$, and the radius $f$ of the field to be covered. During preliminary design choice of distances $z$ and the radius $f$ of the field then give $x$.

FIG. 4 shows the effect of different distances $x$ for an equal rotational angle $\varphi$ of the arm 26 or else 40. In one case, choice of a relatively small distance $x=b$ produces a relatively large angular rotation $\beta$. In another case $x=a$ is relatively large, thereby giving rise to the relatively small rotational angle $\alpha$ through which the reflector 18 is rotated.

If the distance to the center of the field is relatively large, then the extent of rotation must be relatively small. Above the center of the field to be lit, the appropriate angular rotation must be relatively large in order to guarantee synchronization.

In order to effect a synchronizing of all spotlights connected in parallel, it is required that the motors 28 and 42 be turned on until the cranks respectively 24 and 38 hit against the stops respectively 34 and 48. The positions of the stops are set at the time of installation in such locations that the light beams coincide when the cranks are against them. The motors are kept running while cranks are already against the stops, and this causes slipping of frictional clutches 32 and 46 respectively until all cranks of all spotlights have reached their stops. After this, the synchronization of all separate spotlights is of necessity again produced. This can compensate for a possible correction needed after operation for a certain length of time.

The present invention solves the primary object of the invention using an electrical remote control means. However, pneumatic or hydraulic remote control means may be substituted.

According to the invention, a crank is provided for each coordinate for rotating an associated spotlight in a gimbaled or cardanic suspension. In the embodiment presented, a single motor drive utilizes an arm and a rod to grasp the crank at a sliding point of contact. The position of the motors relative to the rotational axis of the spotlight can be adjusted and the arms are the same size for all motors.

The system operates on two perpendicular coordinates. For each coordinate, one crank and one separate motor drive are provided. A single spotlight mounted in the appropriate coordinates above the center of the surface to be lighted or near to the center must sweep through a relatively large angle of rotation in a unit time of adjustment. Therefore in such a case, the adjustable motor drive will grasp the crank with the arm and rod relatively near to the rotational axis in order to produce a large angular rotation. A single spotlight mounted in corresponding coordinates far from the center must sweep through relatively small angle of rotation in the same unit time for adjustment in order to fulfill the requirement that the light beams of both spotlights remain coinciding on the working surface. The motor drive and its swinging arm must, in this circumstance, be positioned at a relatively large distance from the axis of rotation. This results in the required small angular rotation. Consequently, this has the advantage that every separate spotlight can be prefabricated from the same elements.

At the time of installation there is a first opportunity to make a choice of the distance between a drive and its pertinent rotational axis as a function of the position of a spotlight from the center.

The drive motors of all separate spotlights in both coordinates are connected in parallel. Control is effected from a central control panel shown in FIG. 1. It is, of course, also possible to collect several separate spotlights into a group and thus to form several groups that can be controlled independently of one another. This permits several separate spots of light to be produced in the field of lighting simultaneously.

The motions of the cooperating separate spotlights always must be maintained synchronized. Fluctuations in the power supplied to the single drive motors or frictional differences in the bearings can give rise to a loss of the desired intersection between the separate light beams of the spotlights after an extended operational period. This problem is solved according to the invention by provision of a frictional clutch between the motor drive and the crank and a stop for the end position of each crank. Synchronization can be produced thereby anew or checked simply by moving all spotlights to their end positions so that all clutches begin slipping. Following this, synchronization of all separate spotlights of necessity is produced again.

While the housing 10 of each spotlight has been described as fixed to a ceiling or a wall, it is within the scope of the present invention to provide for all spotlights a common support, suspended from the ceiling to move the common support with the spotlights as a unit relative to a ceiling or a wall in a cartesian, cylindrical or spherical coordinate system mechanically or automatically by mechanical drive means such as a screw drive and optionally by additional electric motors. Such a superimposed movement control simplifies alternative adjustments and accurate aiming of the intersecting light beams. When, for instance, the lights are present and properly aimed at an operating table and during the operation, a change in height or inclination of the table is desirable, a simple corresponding change of the common support of the whole lighting system in toto is accomplished by a simple switch movement controlling a means to cause a corresponding change in position of the support in response to the change in the height or inclination of the table. If, for instance, the table is raised, operation of this switch movement correspondingly raises the support with the spotlights as a unit to maintain intersecting of the beams on the same working region on the table as before.

The reflectors in FIG. 1 are shown optionally connected to a housing support 10, which in toto may be raised, lowered, tilted or pushed sidewise by means 10 such as mechanically by motors or manually.

Switch controls such as described in U.S. Patent No. 2,627,560 to control the motors in the desired cooperating sets, either independently or simultaneously, may be employed.

The present specification describes an operative example of the invention for the purposes of the disclosure. It is, however, intended to cover all changes, modifications and combinations of the embodiments shown, and combinations of the present invention with those disclosed in the above cited copending patent application and patents the specification and drawings of which are to be included herein in toto by reference.

With these and further objects in view, as may become apparent from the within disclosure, the invention consists not only in the method, apparatus and structure herein pointed out, but includes further methods, apparatus, and structures coming within the scope of what may be claimed.

The invention claimed is:

1. A lighting system provided with a plurality of individual spotlights, each comprising: a reflector; a light source; said light source situated within said reflector to produce a beam of light; a first and second rotational means to cause rotations of said reflector about a reference axis thereof and about an intersecting axis; intersecting said reference axis; said first rotational means to rotate said reflector about said intersecting axis; said second rotational means to rotate said reflector about said reference axis; a first and a second rotation adjusting means, a synchronization means to synchronize the rotations of the plurality of spotlights about said reference and intersecting axes, a first and a second synchronization adjusting means to adjust the synchronized rotation about said reference and intersecting axes; said reference axis running through the approximate center of said light source and lying perpendicular to said beam of light; said intersecting axis the reference axis at the approximate center of said light source and lying perpendicular to said reference axis, said reference and intersecting axes being horizontal; said first rotational means comprising a fixed support housing, a journal bearing rigidly mounted on said support housing, said bearing having its rotational bearing axis coinciding with said intersecting axis, a frame mounted rotatably in said bearing to rotate about said bearing axis, said reflector mounted on a reflector mount in said frame, said reference axis perpendicular to said bearing axis, a first crank with a slot running along its longitudinal axis, said first crank rigidly mounted on said frame with its said longitudinal axis perpendicular to said bearing axis; a first electric motor with a rotating shaft, an arm mounted with one end rigidly on said shaft, perpendicular thereto; a rod mounted rigidly on said arm at its shaft-opposite end, said rod running parallel to said shaft and having a diameter slightly less than the width of said slot, said first motor mounted fixedly to said support housing, said shaft running parallel to and removed from said bearing axis, said rod of said first motor extending into the slot in said first crank.

2. A lighting system as claimed in claim 1, said second rotational means comprising at least one pin with the pin-axis coinciding with said reference axis, said pin mounted rotatably about its pin-axis in said frame, said reflector mount being said pin, a second crank with a slot running along its longitudinal axis, said second crank fixedly mounted on said pin with its said longitudinal axis perpendicular to said pin axis; a second electric motor with a rotating shaft, an arm mounted with one end rigidly on said shaft, extending perpendicularly thereto; a rod mounted rigidly on said arm at its shaft-opposite end, said rod running parallel to said shaft and having a diameter slightly less than the width of the slot in said second crank, said second motor mounted fixedly on said frame with its shaft running parallel to and removed from said pin axis, said rod of said second motor extending into the slot in said second crank.

3. A lighting system as claimed in claim 2, the distance between the axes of said shaft and said rod of said first motor being equal to the distance between the axes of said shaft and said rod of said second motor.

4. A lighting system as claimed in claim 2, said synchronizing means comprising means to connect said first and second motors of the plurality of spotlights in parallel to a single current source, said first and second motors being synchronous electric motors.

5. A lighting system as claimed in claim 2, said first and second synchronization adjusting means comprising pairs of stops to block clockwise and counter clockwise rotations of said cranks at predetermined limits, and friction clutches interposed between shaft and arms when cranks are blocked by said stops.

6. A lighting system as claimed in claim 2, said first rotation adjusting means comprising motor-position sliding means to adjust the distance $x_1$ between the axis of said first motor shaft and said bearing axis and said second rotation adjusting means comprising motor-positioning sliding means to adjust the distance $x_2$ between the axis of said second motor shaft and said pin axis.

7. A lighting system as claimed in claim 6, the first motor shaft axis being spaced from the bearing axis and the second motor shaft axis being spaced from said pin axis distances $x_1$ and $x_2$ determined by the following equation:

$$\frac{r^2 \sin^2 \varphi}{x^2+r^2+2xr \cos \varphi}+\frac{(y^2+z^2+f^2)^2}{(y^2+z^2+f^2)-4z_1^2 \cdot f^2}=1$$

References Cited

UNITED STATES PATENTS

| | | | |
|---|---|---|---|
| 3,005,087 | 10/1961 | Klein | 240—1.4 |
| 3,225,184 | 12/1965 | Reiber | 240—62.4 XR |
| 3,287,552 | 11/1966 | Drandell | 240—1.4 XR |

FOREIGN PATENTS

| | | |
|---|---|---|
| 841,606 | 2/1939 | France. |

NORTON ANSHER, *Primary Examiner.*

JOSEPH F. PETERS, D. L. JACOBSON,
*Assistant Examiners.*